(12) United States Patent
Rochell et al.

(10) Patent No.: US 10,807,431 B2
(45) Date of Patent: Oct. 20, 2020

(54) LEAF SPRING ARRANGEMENT HAVING A LEAF SPRING MADE OF A FIBRE-COMPOSITE MATERIAL AND AT LEAST ONE BEARING EYE HOLDER

(71) Applicant: BENTELER AUTOMOBILTECHNIK GMBH, Paderborn (DE)

(72) Inventors: Dirk Rochell, Paderborn (DE); Dennis Kleinhans, Paderborn (DE); Johannes Boeke, Blomberg (DE); Hendrik Reineke, Bad Driburg (DE); Lars Siervers, Paderborn (DE)

(73) Assignee: BENTELER AUTOMOBILTECHNIK GMBH, Paderborn (DE)

(*) Notice: Subject to any disclaimer, the term of this patent is extended or adjusted under 35 U.S.C. 154(b) by 0 days.

(21) Appl. No.: 16/110,214

(22) Filed: Aug. 23, 2018

(65) Prior Publication Data

US 2019/0061454 A1    Feb. 28, 2019

(30) Foreign Application Priority Data

Aug. 25, 2017    (DE) .................. 10 2017 119 468

(51) Int. Cl.
*B60G 11/10*    (2006.01)

(52) U.S. Cl.
CPC ........ *B60G 11/10* (2013.01); *B60G 2204/121* (2013.01); *B60G 2206/428* (2013.01); *B60G 2206/7101* (2013.01)

(58) Field of Classification Search
CPC ............ B60G 11/10; B60G 2206/7101; B60G 2204/121; B60G 11/12; B60G 2206/428;
(Continued)

(56) References Cited

U.S. PATENT DOCUMENTS 4,562,998 A    1/1986  Wared
9,630,467 B2*  4/2017  Soles ..................... B60G 11/12
(Continued)

FOREIGN PATENT DOCUMENTS

DE    3920926 A1 *  1/1991
EP    0299805        1/1989
(Continued)

OTHER PUBLICATIONS

Translation of DE 3920926 document obtained from website: https://worldwide.espacenet.com on Oct. 29, 2019.*

*Primary Examiner* — Pamela Rodriguez
(74) *Attorney, Agent, or Firm* — Sheridan Ross P.C.

(57) ABSTRACT

The invention relates to a leaf spring arrangement having a leaf spring made of a fibre-composite material and at least one bearing eye holder, wherein at least one end of the leaf spring is accommodated in a retaining element of the at least one bearing eye holder in a form-fitting manner in a longitudinal direction of the leaf spring, wherein the leaf spring has a length and a central longitudinal plane, wherein the leaf spring has, along its length, perpendicularly to the central longitudinal plane, a cross section in which both a depth and a height are constant along the entire length of the at least one end of the leaf spring, wherein the at least one end of the leaf spring is formed in an undulating manner, wherein the retaining element of the at least one bearing eye holder has a receptacle with a matching undulating shape, wherein the at least one end of the leaf spring has at least one undulation, wherein the receptacle of the at least one bearing eye holder is configured to accommodate the at least one undulation of the leaf spring. The leaf spring arrangement is distinguished by the fact that the at least one end of the leaf spring has at least two undulations, wherein the receptacle of the at least one bearing eye holder is configured to accom-
(Continued)

modate the at least two undulations of the leaf spring in a form-fitting manner.

7 Claims, 8 Drawing Sheets

(58) Field of Classification Search
CPC .......... F16F 1/3849; F16F 1/28; F16F 1/3686; F16F 1/30; F16F 1/26
USPC ........ 267/260, 53, 36.1, 179, 270, 271, 292, 267/293
See application file for complete search history.

(56) References Cited

U.S. PATENT DOCUMENTS

| | | | |
|---|---|---|---|
| 10,124,641 B2* | 11/2018 | Boeke | B60G 11/113 |
| 10,414,230 B2* | 9/2019 | Drabon | F16C 11/04 |
| 2012/0073884 A1* | 3/2012 | Guthrie | B60G 11/00 177/225 |
| 2016/0207369 A1* | 7/2016 | Krahn | F16F 1/26 |
| 2017/0113504 A1* | 4/2017 | Drabon | B60G 11/10 |

FOREIGN PATENT DOCUMENTS

| | | |
|---|---|---|
| GB | 2158548 | 11/1985 |
| JP | S55-166536 | 12/1980 |

* cited by examiner

LEAF SPRING ARRANGEMENT HAVING A LEAF SPRING MADE OF A FIBRE-COMPOSITE MATERIAL AND AT LEAST ONE BEARING EYE HOLDER

CROSS-REFERENCE TO RELATED APPLICATIONS

This application claims the benefit of German Patent Application No. DE 10 2017 119 468.1 filed Aug. 25, 2017, the entire contents of which are incorporated herein by reference.

FIELD

The invention relates to a leaf spring arrangement having a leaf spring made of a fibre-composite material and at least one bearing eye holder.

BACKGROUND

Conventional leaf springs made of fibre-composite materials are generally embodied in a uniform manner along their entire longitudinal extent, such that they have an identical fibre volume ratio along their entire longitudinal extent. In order to connect the leaf spring to the bearing eye holder in a force-fitting manner, provision is made here for mechanical fastening means, such as clamping sleeves or through-bolts, to be provided, which are passed both through corresponding orifices in the bearing eye holder and through the leaf spring in order to connect the leaf spring to the bearing eye holder in a force-fitting manner. Such an arrangement is described for example in EP 007 012 B. In the event of a dynamic load, which occurs when such a leaf spring arrangement is in use, relative movements between the bearing eye holder and the leaf spring occur, however, resulting in increased wear. As a result, for example when arranged appropriately in a motor vehicle, when force is exerted on the leaf spring in the direction of travel, it is also possible for the leaf spring to shift by a few millimetres in the bearing eye holder.

In order to circumvent these problems, leaf spring arrangements having a leaf spring made of a fibre-composite material have already been proposed, wherein the ends of the leaf spring are accommodated in a form-fitting manner in a retaining element of a bearing eye holder. Such leaf spring arrangements are already known from DE 39 20 926 A1 and DE 10 2016 106 379 A1. In the case of those leaf spring arrangements, the leaf springs used therein are provided at their end with additional elements, by way of which form-fitting accommodation of the leaf spring in corresponding retaining elements of the bearing eye holders of said documents is provided.

In the case of DE 10 2016 106 379 A1, corresponding wedge portions are provided at the ends of the leaf springs, and in the case of DE 39 20 926 A1, the ends of the leaf spring therein are provided with a cross-sectionally trapezoidal or circular-arc-shaped elevation. Both the wedge-like portion in DE 10 2016 106 379 A1 and the circular-arc-shaped or cross-sectionally trapezoidal elevation in DE 39 20 926 A1 have to be realized by addition of material or reduction of material. In order to obtain such leaf springs made of a fibre-composite material in these forms, either additional fibres have to be introduced or they have to be removed, and so it is not possible to ensure a homogeneous fibre composite in the end regions of the leaf spring with the spring region of the leaf spring.

SUMMARY

Both JP 55166536 and EP 0 299 805 A2 already disclose leaf spring arrangements. However, in those leaf spring arrangements, too, it is possible to ensure secure accommodation of the leaf spring made of the fibre-composite material in the bearing eye holder without it being possible for the leaf spring to shift within the bearing eye holder, wherein the ends of the leaf spring do not have to be reworked by inclusion or removal of material before installation in the leaf spring arrangement.

Therefore, it is an object of the invention to develop a leaf spring arrangement having a leaf spring made of a fibre-composite material and at least one bearing eye holder in such a way that it is possible to ensure secure accommodation of the leaf spring made of the fibre-composite material in the bearing eye holder without it being possible for the leaf spring to shift within the bearing eye holder, wherein the ends of the leaf spring do not have to be reworked by inclusion or removal of material before installation in the leaf spring arrangement.

This object is achieved by a leaf spring arrangement having a leaf spring made of a fibre-composite material and at least one bearing eye holder having all the features of Claim 1. Advantageous configurations of the invention can be found in the dependent claims.

The leaf spring arrangement according to the invention having a leaf spring made of a fibre-composite material and at least one bearing eye holder is in this case configured such that at least one end of the leaf spring is accommodated in a retaining element of the at least one bearing eye holder in a form-fitting manner in a longitudinal direction of the leaf spring, and is characterized in that the leaf spring has a length and a central longitudinal plane, wherein the leaf spring has, along its length, perpendicularly to the central longitudinal plane, a cross section in which both a depth and a height are constant along the entire length of the at least one end of the leaf spring, wherein the at least one end of the leaf spring is formed in an undulating manner, wherein the retaining element of the at least one bearing eye holder has a receptacle with a matching undulating shape, wherein the receptacle for the at least one end of the leaf spring is arranged between two legs of the retaining element. The invention is now distinguished by the fact that the at least one end of the leaf spring has two undulations, wherein the receptacle of the at least one bearing eye holder is configured to accommodate the at least two undulations of the leaf springs in a form-fitting manner.

This configuration according to the invention of the leaf spring arrangement now ensures that, during the production of the leaf springs, no additions of material or removals of material are necessary in the end regions of the leaf springs. The form-fitting accommodation of the leaf springs in the retaining element of the bearing eye holder and of the constant cross section, which is defined by way of the constant height and the constant depth along the longitudinal extent of the at least one end of the leaf spring, ensures that leaf springs for leaf spring arrangements according to the invention are equipped with an identical fibre volume ratio along their entire longitudinal extent of the at least one end. This makes it possible for the leaf spring not to have to be adapted to the bearing eye holder by inclusion or removal of material and to be correspondingly reworked before installation in the leaf spring arrangement. In addition, this results in a very homogeneous fibre composite at the at least one end, and so there are no preferential points of attack under loading during operation of the leaf spring arrangement at the at least one end. In order to realize such a form fit, it is necessary for the cross section of the leaf spring to be shifted, at the at least one end, at least once in the direction of the height of the cross section and then to be guided back again, or vice versa. As a result, a corresponding form fit of the ends of the leaf spring in the corresponding retaining element of the bearing eye holder is realized. The leaf spring arrangement according to the invention now makes it possible for the ends of the leaf spring to be retained in the corresponding retaining elements of the bearing eye holder in a form-fitting manner such that greater force exertion is possible before any shifting at all, let alone rupturing of the spring occurs. In particular, leaf spring arrangements according to the invention are suitable even for heavy motor vehicles with a weight of more than 5 tonnes.

As a result of the configuration whereby the at least one end of the leaf spring is configured in an undulating manner, wherein the retaining element of the at least one bearing eye holder has a receptacle with a matching undulating shape, it is possible for the undulating end of the leaf spring now to be accommodated in a form-fitting manner in the corresponding receptacles of the retaining element of the at least one bearing eye holder, without the fibre volume ratio of the leaf spring having to be changed in the region of its ends, and thus reworking for the purpose of adaptation to the bearing eye holder, for example by inclusion or removal of material at the respective ends, is dispensed with. The undulating shape of the ends and the corresponding receptacle of the retaining element of the at least one bearing eye holder ensures the form-fitting arrangement of the leaf spring in the retaining element of the at least one bearing eye holder. As a result of the undulating shape, a form fit is achieved which ensures reliable force input into the bearing eye holder upon loading of the leaf spring, without any shifting of the leaf spring within the receptacle of the retaining element of the at least one bearing eye holder occurring.

Advantageously, the receptacle for the at least one end of the leaf spring is arranged between two legs of the retaining element. In this case, these legs can be configured such that, when the ends of the leaf spring are introduced into the receptacles of the retaining element, they are pushed apart and then press against the at least one end of the leaf spring with a preload, thereby improving the secure retention of the leaf spring in the bearing eye holders even further.

The simple result of the configuration whereby the at least one end of the leaf spring has at least one undulation and, analogously thereto, the receptacle of the at least one bearing eye holder is configured to accommodate the at least one undulation of the leaf spring in a form-fitting manner, the ends of the leaf spring cannot move in the longitudinal direction of the leaf spring under loading. This ensures secure form-fitting accommodation of the ends of the leaf spring in the retaining element of the at least one bearing eye holder. Such undulating leaf springs made of fibre-composite materials can be produced relatively easily by means of RTM (resin transfer moulding), in which the resin/curing-agent mixture is introduced into a mould, for example fibres of a fibre-composite material are layered on top of one another in a corresponding mould and are fixed and cured with the corresponding undulating shape by means of a resin. However, other production methods are of course also possible, for example the autoclave method, in which what are known as prepregs—reinforcing fabric preimpregnated with specific resin and pre-cured—are used, or winding methods, in which the fibres are wound for example around a positive core.

In order now to be able to ensure even more secure accommodation of the leaf spring made of the fibre-composite material in the bearing eye holder without it being possible for the leaf spring to shift within the bearing eye holder, wherein the ends of the leaf spring do not have to be reworked by inclusion or removal of material before installation in the leaf spring arrangement, the invention provides for the at least one end of the leaf spring to have two undulations, wherein the receptacle of the at least one bearing eye holder is configured to accommodate the at least two undulations of the leaf springs in a form-fitting manner.

The configuration of the invention whereby the at least one end of the leaf spring has three undulations is aimed in the same direction. In this case, the receptacle of the at least one bearing eye holder is of course configured to accommodate the at least three undulations of the leaf springs in a form-fitting manner. This also ensures in a simple manner that longitudinal shifting of the leaf spring in the retaining element of the at least one bearing eye holder under loading of the leaf spring is not possible. Such leaf springs are produced analogously to the above-described leaf spring with at least one undulation.

Of course, other undulating shapes for the ends of the leaf spring are also conceivable in principle, in order to arrange them in a form-fitting manner in corresponding retaining elements of the bearing eye holder. However, in the configuration of the ends of the leaf springs with two or with three undulations, a sufficient form fit is achieved and it is technically easier to produce such leaf springs from a composite material than if more than three undulations had to be introduced into the ends of the leaf spring.

Furthermore, other shapes than this undulating shape are also conceivable in order to accommodate the ends of the leaf springs in corresponding retaining elements of the bearing eye holder. In this case, it is merely necessary to ensure that the constant cross section of the leaf spring has to be guided upwards and back again or vice versa at least once along its longitudinal extent. The undulating shape considered according to the invention is suitable in principle, since, in this case, no angles have to be introduced into the fibre-composite material of which the leaf spring consists, said angles being difficult to realize in fibre-composite materials.

In order, in addition to the form fit of the ends of the leaf spring in the corresponding retaining element of the bearing eye holder, to achieve a material bond between the leaf spring, or the ends thereof, and the retaining element of the bearing eye holder, an adhesive is provided. By means of this adhesive, the ends of the leaf springs in the receptacles of the at least one bearing eye holder can be connected to the latter in a materially bonded manner.

In addition, it is of course also possible to connect the leaf springs, or the ends thereof, to the bearing eye holder by means of screw connections. To this end, provision can be made for the at least one bearing eye holder to have corresponding orifices for screw connections, or sleeves through which corresponding screw connections are passed, which are matched to corresponding through-orifices in the leaf springs. In principle, however, it is not necessary to realize such screw connections in addition to the form-fitting connection of the ends of the leaf springs to the bearing eye holder, which is optionally even configured additionally in a materially bonded manner by means of an adhesive. The form-fitting fixing of the ends of the leaf spring in the receptacles of the retaining element of the bearing eye holder is entirely sufficient for greater force exertions compared with the leaf spring arrangements that are known from the prior art, in particular when the ends of the leaf spring are also connected to the receptacles of the retaining elements of the bearing eye holder in a materially bonded manner by means of an adhesive.

Further aims, advantages, features and possible applications of the present invention will become apparent from the following description of an exemplary embodiment with reference to the drawings. Here, all the features that are described and/or depicted form the subject matter of the present invention separately or in any meaningful combination, regardless of how they are combined in the claims or the back-references of the latter.

DETAILED DESCRIPTION

Figure 1:
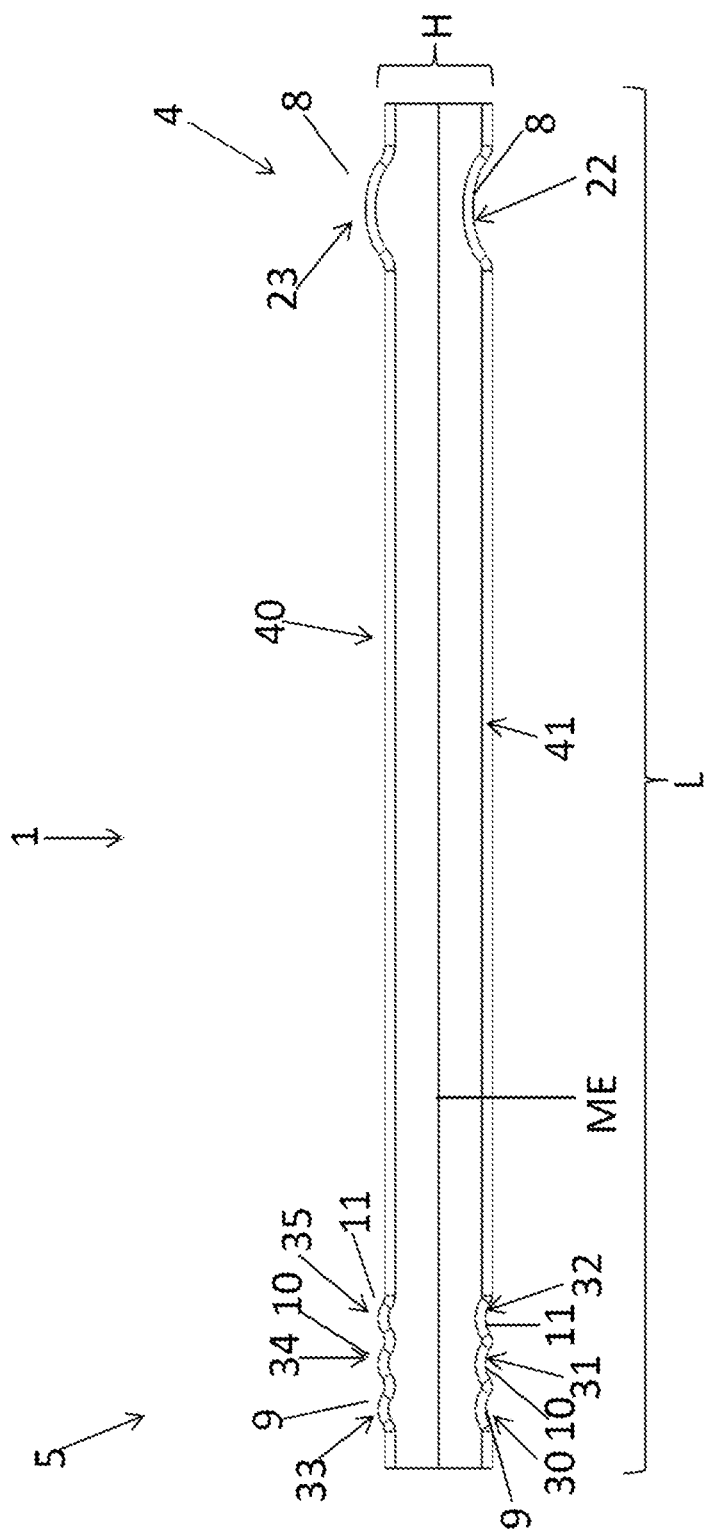
FIG. 1 shows a side view of an exemplary embodiment of a leaf spring of a leaf spring arrangement according to the invention.
Figure 2:
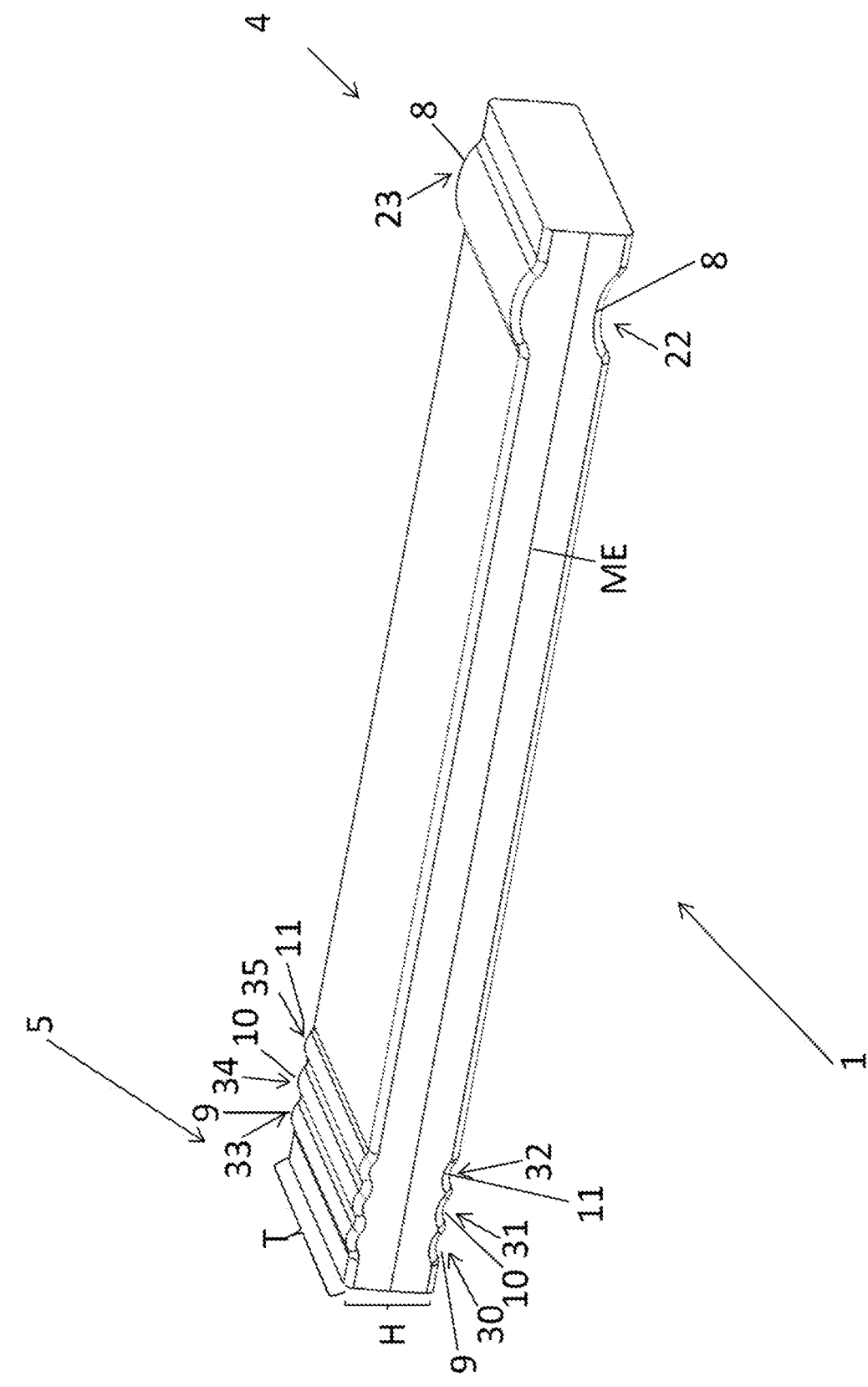
FIG. 2 shows a perspective view of the leaf spring from FIG. 1.

FIGS. 1 and 2 illustrate a side view and a perspective view of an exemplary embodiment of a leaf spring 1 of a leaf spring arrangement according to the invention. The leaf spring 1, which consists of a fibre-composite material, has a length L, and, at its ends 4 and 5, a height H and a depth T. The height H is substantially perpendicular to the depth T, such that, via the height H and the depth T, the cross section of the leaf spring 1 is defined along its longitudinal extent along the length of the ends 4 and 5. The cross section is in this case configured in a substantially rectangular manner, wherein the corners are rounded. As a result of the identical cross section along the longitudinal extent of the ends 4 and 5 of the leaf spring 1, it is possible for the ends 4 and 5 of the leaf spring 1 not to require any addition of material or reduction of material in order to be used in a leaf spring arrangement according to the invention.

The right-hand end 4, in FIGS. 1 and 2, of the leaf spring 1 has in this case an undulation 8, wherein the latter forms an elevation 23 on a top side 40 of the leaf spring 1 and an indentation 22 on an underside 41 of the leaf spring 1.

The other end 5 of the leaf spring 1, which is illustrated on the left-hand side in FIGS. 1 and 2, has in this case three undulations 9, 10 and 11. Here, the undulations 9, 10 and 11 are formed on the top side 40 of the leaf spring 1 by corresponding elevations 33, 34 and 35, while the undulations 9, 10 and 11 are formed on the underside 41 of the leaf spring 1 by corresponding indentations 30, 31 and 32.

In the present exemplary embodiment in FIGS. 1 and 2, the leaf spring 1 thus has three undulations 9, 10 and 11 at its left-hand end 5 and one undulation 8 at its right-hand end 4. Of course, other undulating shapes are also conceivable or a uniform configuration of the two ends 4 and 5 of the leaf spring 1 with an identical number of undulations is possible. Furthermore, it is also conceivable for the arrangement of the elevations and indentations on the top side 40 and underside 41 of the leaf spring 1 to be oriented in some other way. All that is important is that, in conjunction with corresponding bearing eye holders, a corresponding form fit is achieved.

Figure 3:
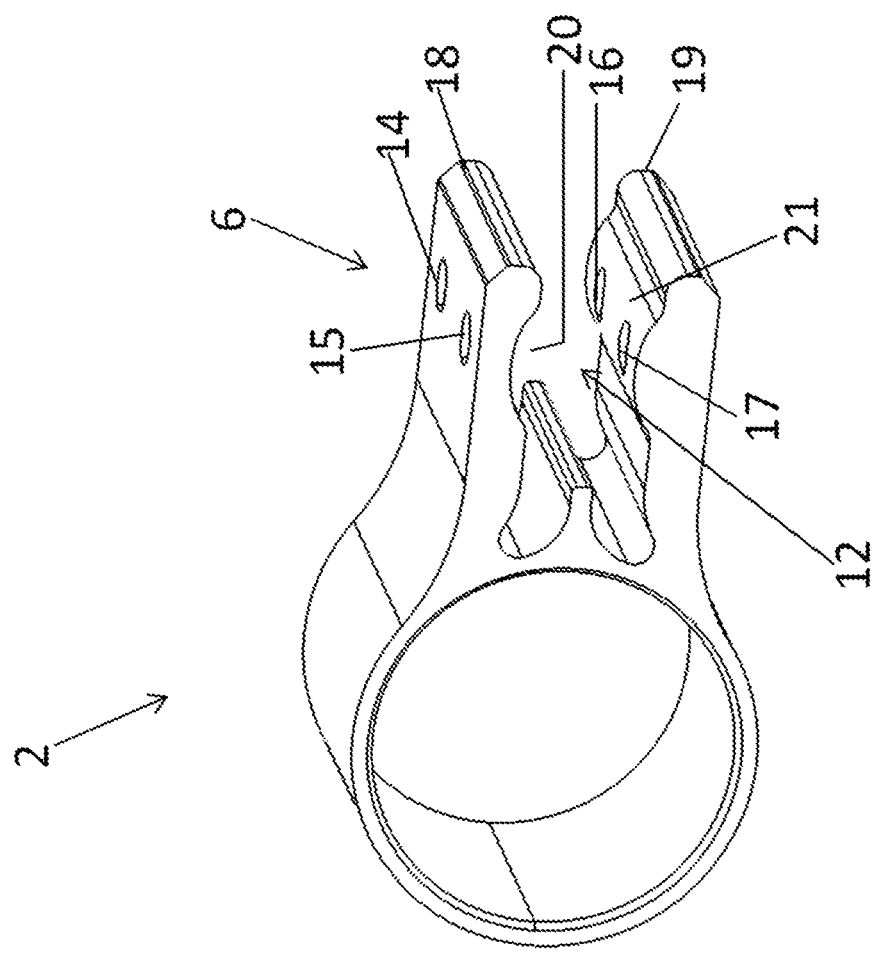
FIG. 3 shows a perspective view of an exemplary embodiment of a bearing eye holder of a leaf spring arrangement according to the invention.

FIG. 3 now illustrates a perspective view of a bearing eye holder 2, which enables a right-hand end 4 of the leaf spring 1 according to FIGS. 1 and 2 to be accommodated in a form-fitting manner. The bearing eye holder 2 has a retaining element 6, which is formed from an upper leg 18 and a lower leg 19. Located between the two legs 18 and 19 is a receptacle 12, in which the end 4 of the leaf spring 1 according to FIGS. 1 and 2 having the undulation 8 thereof can be accommodated in a form-fitting manner. The receptacle 12 is in this case defined in terms of shape by the legs 18 and 19, such that the elevation 23 of the undulation 8 of the leaf spring 1 is able to be accommodated in a form-fitting manner in an indentation 20 in the leg 18, while the indentation 22 of the undulation 8 of the leaf spring 1 is able to be accommodated in a form-fitting manner by an elevation 21 on the leg 19 of the bearing eye holder 2.

Also, in FIG. 3, two orifices 14 and 15 are arranged in the leg 18 of the bearing eye holder 2 and two orifices 16 and 17 are arranged in the leg 19. Said orifices can serve, if appropriate, to produce a releasable or non-releasable closing element, for example in the form of a screwed connection or riveted connection, between the retaining element 6 of the bearing eye holder 2 and an end of a corresponding leaf spring 1, if this leaf spring 1 is likewise provided with corresponding through-orifices in its end regions, said closing element not being necessary for reliable operation of the leaf spring arrangement. According to the invention, for proper and reliable operation of a leaf spring arrangement according to the invention, such closing elements are not actually necessary, since the form-fitting connection is entirely suitable for ensuring reliable operation of the leaf spring arrangement.

Figure 4:
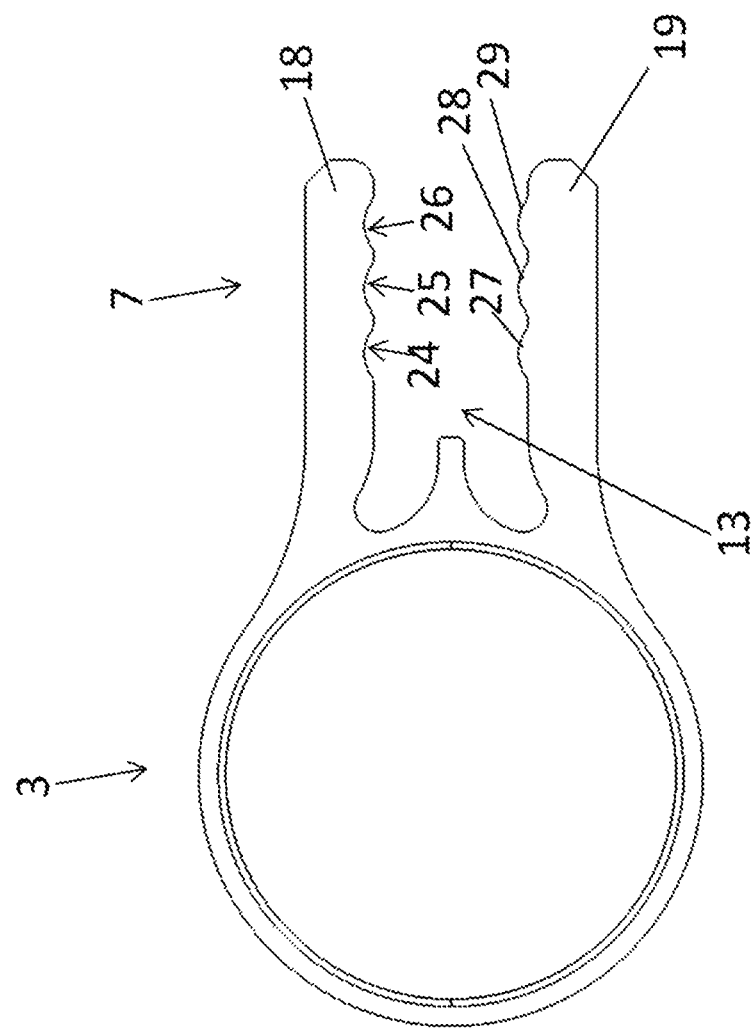
FIG. 4 shows a side view of a further exemplary embodiment of a bearing eye holder of a leaf spring arrangement according to the invention.

FIG. 4 now illustrates a side view of a further exemplary embodiment of a bearing eye holder. The bearing eye holder 3 is configured to accommodate the end 5 of a leaf spring 1 according to FIGS. 1 and 2 in a form-fitting manner. To this end, the bearing eye holder 3 has a retaining element 7, which is formed by two legs 18 and 19. The legs 18 and 19 define a receptacle 13, in which the end 5 of the leaf spring 1 according to FIGS. 1 and 2 can be accommodated in a form-fitting manner. In this case, the upper leg 18 has three indentations 24, 25 and 26, in which the elevations 33, 34 and 35 of the undulations 9, 10 and 11 on the end 5 of the leaf spring 1 according to FIGS. 1 and 2 are able to be accommodated in a form-fitting manner. The lower leg 19 has three elevations 27, 28 and 29, which enter into a form-fitting connection with the indentations 30, 31 and 32 of the undulations 9, 10 and 11. The receptacle 13 is, as already indicated, defined by the shape of the legs 18 and 19 of the retaining element 7 and corresponds substantially to the shape of the left-hand end 5 of the leaf spring 1 according to FIGS. 1 and 2.

Figure 5:
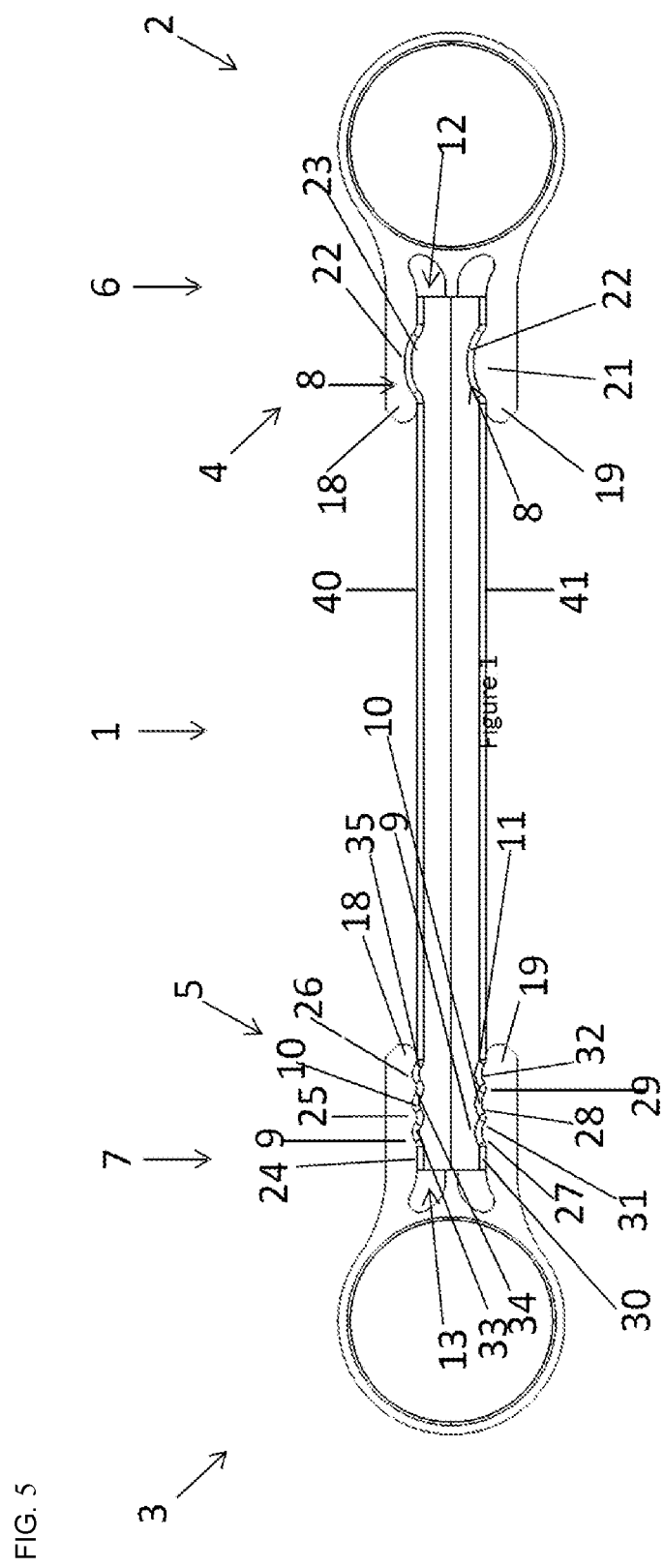
FIG. 5 shows a side view of an exemplary embodiment of a leaf spring arrangement according to the invention having a leaf spring according to FIGS. 1 and 2 and a bearing eye holder according to FIG. 3 and a bearing eye holder from FIG. 4.
Figure 6:
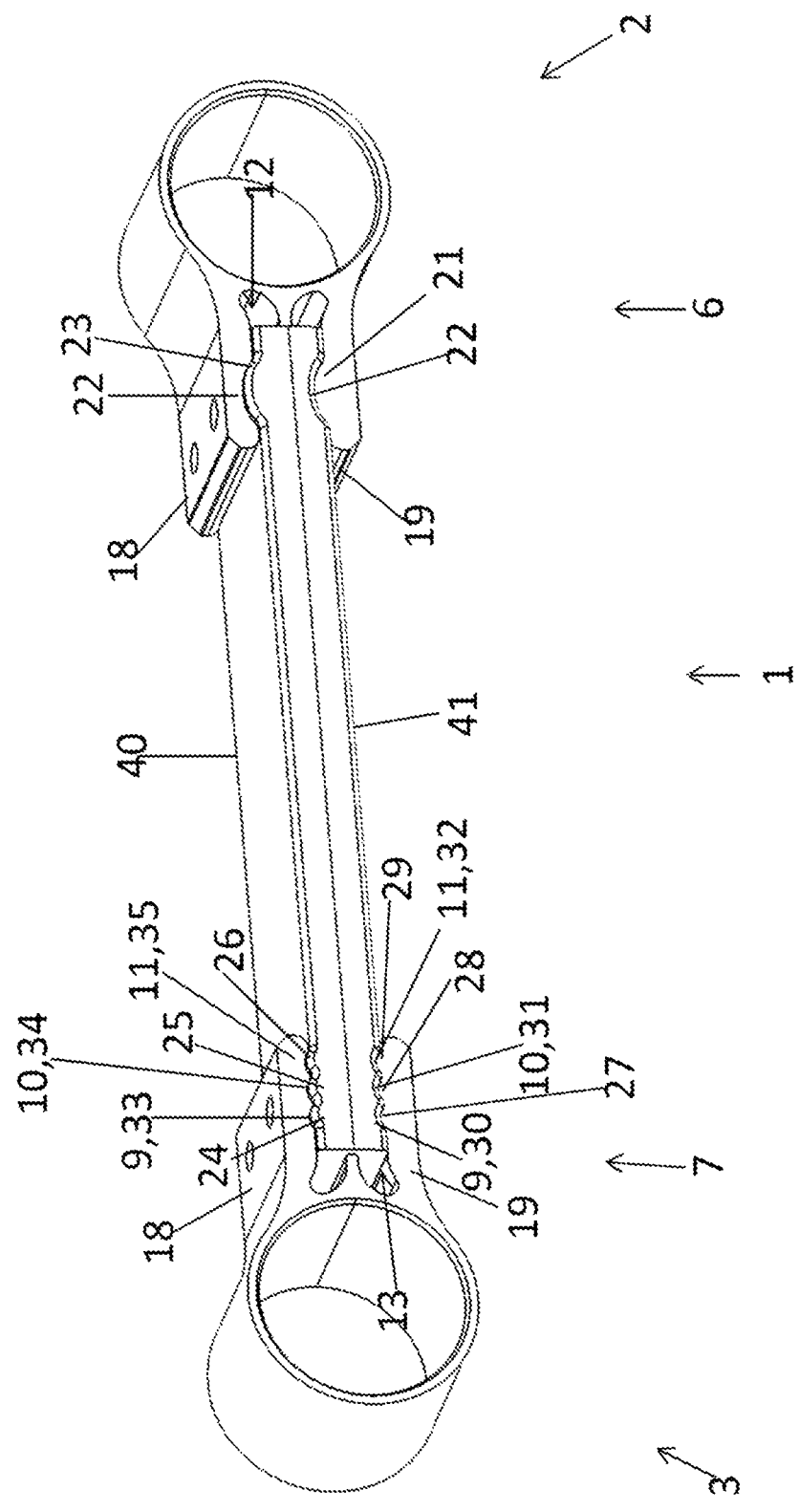
FIG. 6 shows a perspective view of the leaf spring arrangement from FIG. 5.

FIGS. 5 and 6 now show a leaf spring arrangement according to the invention having a leaf spring 1 according to FIGS. 1 and 2 and a bearing eye holder 2 and 3 according to FIGS. 3 and 4.

FIG. 5 illustrates a side view of this leaf spring arrangement. It is clearly apparent therefrom how the retaining element 6 of the bearing eye holder 2 engages around the end 4 of the leaf spring 1 in a form-fitting manner with its legs 18 and 19. In this case, the elevation 23 of the undulation 8 on the end 4 of the leaf spring 1 is accommodated in a form-fitting manner in the indentation 22 in the leg 18 of the retaining element 6. The leg 19 of the retaining element 6 of the bearing eye holder 2 also engages with its elevation 21 likewise in a form-fitting manner in the indentation 22 of the undulation 8 on the end 4 of the leaf spring 1. In this regard, the end 4 is retained in the receptacle 12 of the retaining element 6 of the bearing eye holder 2 securely and stably in a form-fitting manner between the legs 18 and 19. This form fit can also be supported by a material bond, when the end 4 is materially bonded to the legs 18 and 19 of the retaining element 6 of the bearing eye holder 2 by means of an adhesive.

In the same way, the end 5 of the leaf spring 1 is connected to the bearing eye holder 3. In this case, the elevations 33, 34 and 35 of the undulations 9, 10 and 11 on the end 5 of the leaf spring 1 engage in a form-fitting manner in corresponding indentations 24, 25 and 26 in the leg 18 of the retaining element 7 of the bearing eye holder 3. Compared with the leg 18, the leg 19 engages with its elevations 27, 28 and 29 in a corresponding form-fitting manner in corresponding indentations 30, 31 and 32 of the undulations 9, 10 and 11 on the end 5 of the leaf spring 1. At this end 5 of the leaf spring 1, too, the form fit between the leaf spring 1 and the bearing eye holder 3 in the receptacle 13 thereof can be further reinforced by means of a material bond. The material bond can also be realized in this case by means of an adhesive between the top side 40 of the leaf spring 1 at the end 5 thereof and the leg 18 and between the underside 41 of the leaf spring 1 at the end 5 thereof and the leg 19 of the bearing eye holder 3.

Furthermore, the legs 18 and 19 can be configured such that, when the ends 4 and 5 of the leaf spring 1 are introduced into the receptacles 12 and 13, they are pushed apart and then press against the ends 4 and 5 of the leaf spring 1 with a preload, with the result that the secure retention of the leaf spring 1 in the bearing eye holders 2 and 3 is further improved.

FIG. 6 shows a perspective view, corresponding to FIG. 5, of the leaf spring arrangement.

Figure 7:
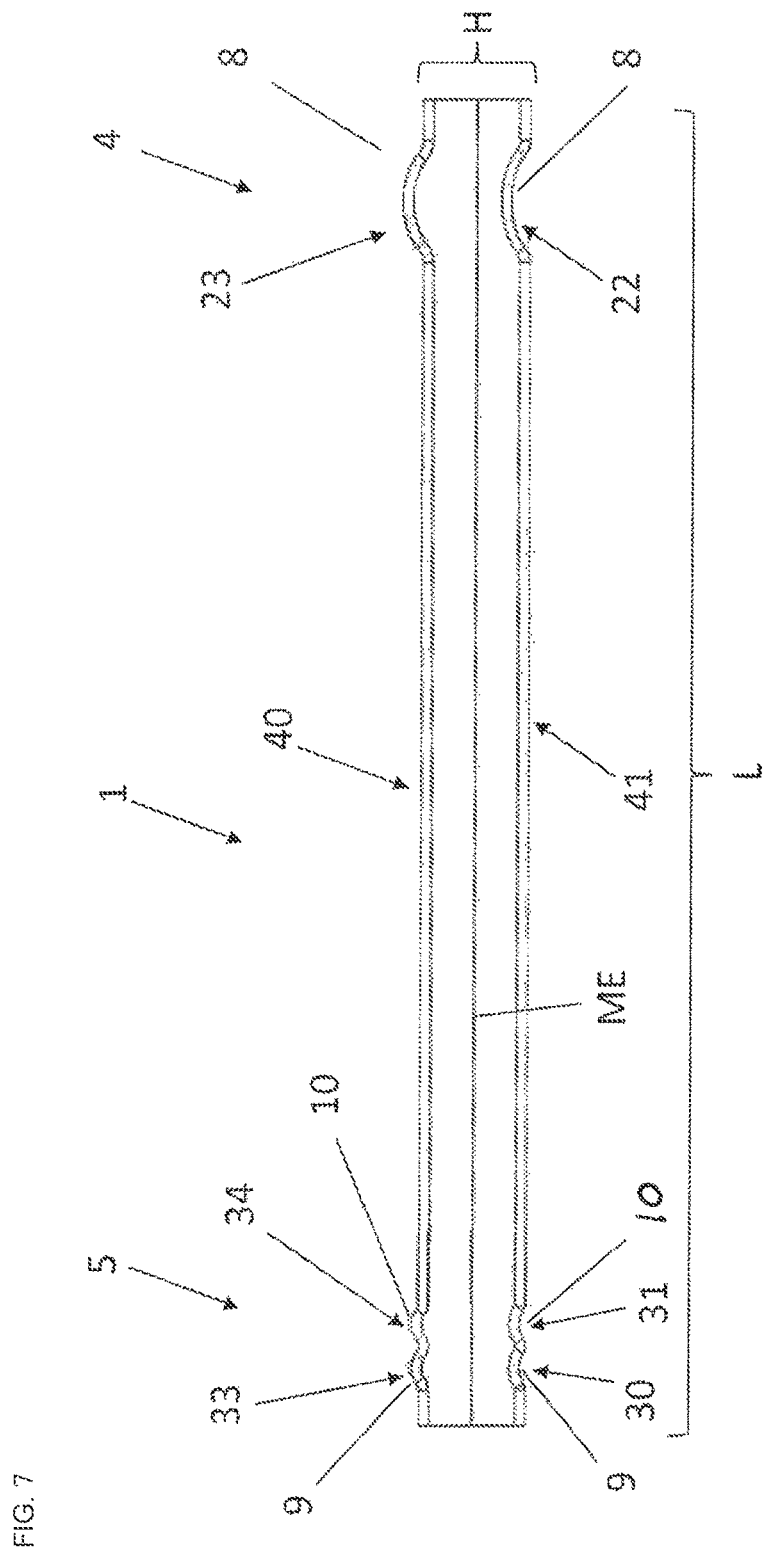
FIG. 7 shows a side view of a further exemplary embodiment of a leaf spring of a leaf spring arrangement according to the invention.

FIG. 7 illustrates a side view of an exemplary embodiment of a leaf spring 1 of a leaf spring arrangement according to the invention. The leaf spring 1, which consists of a fibre-composite material, has a length L, and, at its ends 4 and 5, a height H and a depth T. The height H is substantially perpendicular to the depth T, such that, via the height H and the depth T, the cross section of the leaf spring 1 is defined along its longitudinal extent along the length of the ends 4 and 5. The cross section is in this case configured in a substantially rectangular manner, wherein the corners are rounded. As a result of the identical cross section along the longitudinal extent of the ends 4 and 5 of the leaf spring 1, it is possible for the ends 4 and 5 of the leaf spring 1 not to require any addition of material or reduction of material in order to be used in a leaf spring arrangement according to the invention.

The right-hand end 4, in FIG. 7, of the leaf spring 1 has in this case an undulation 8, wherein the latter forms an elevation 23 on a top side 40 of the leaf spring 1 and an indentation 22 on an underside 41 of the leaf spring 1.

The other end 5 of the leaf spring 1, which is illustrated on the left-hand side in FIG. 7, has in this case two undulations 9 and 10. Here, the undulations 9 and 10 are formed on the top side 40 of the leaf spring 1 by corresponding elevations 33 and 34, while the undulations 9 and 10 are formed on the underside 41 of the leaf spring 1 by corresponding indentations 30 and 31.

In the present exemplary embodiment in FIG. 7, the leaf spring 1 thus has two undulations 9 and 10 at its left-hand end 5 and one undulation 8 at its right-hand end 4.

Figure 8:
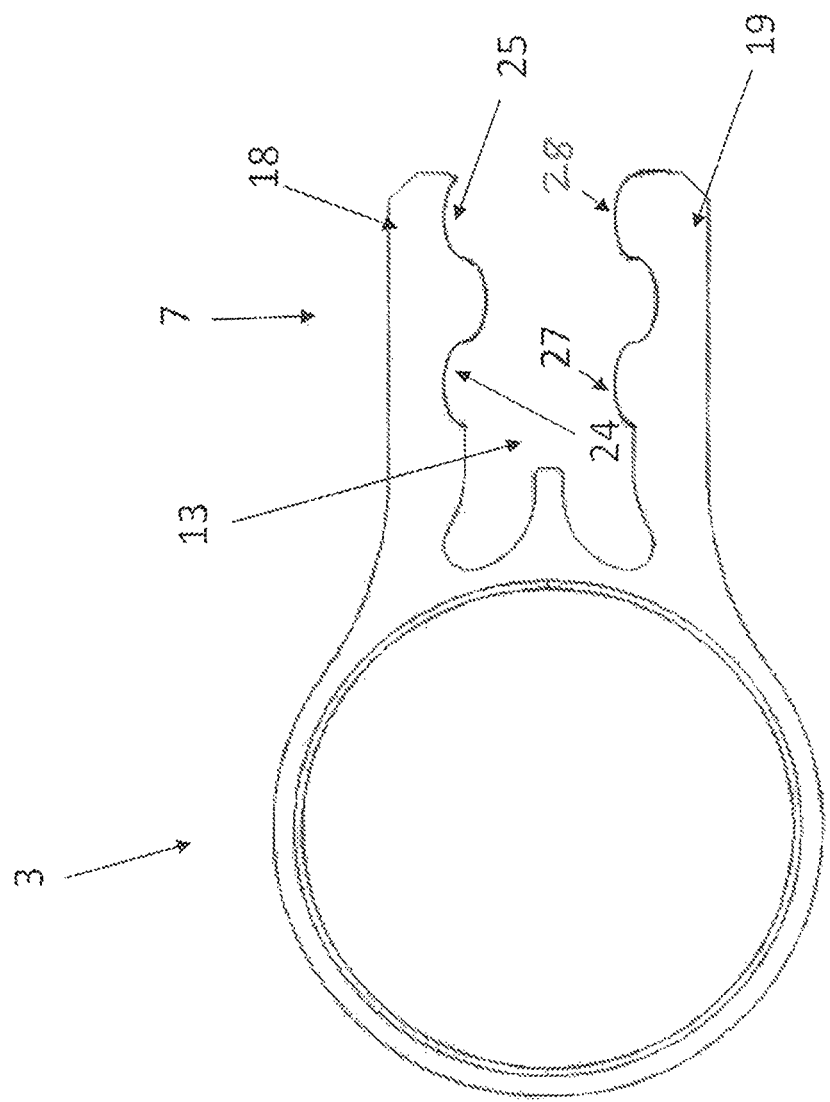
FIG. 8 shows a side view of an exemplary embodiment of a bearing eye holder of a leaf spring arrangement according to the invention, for accommodating the left-hand end of the leaf spring according to FIG. 7.

FIG. 8 now illustrates a side view of a further exemplary embodiment of a bearing eye holder. The bearing eye holder 3 is configured to accommodate the left-hand end 5 of a leaf spring 1 according to FIG. 7 in a form-fitting manner. To this end, the bearing eye holder 3 has a retaining element 7, which is formed by two legs 18 and 19. The legs 18 and 19 define a receptacle 13, in which the left-hand end 5 of the leaf spring 1 according to FIG. 7 can be accommodated in a form-fitting manner. In this case, the upper leg 18 has two indentations 24 and 25, in which the elevations 33 and 34 of the undulations 9 and 10 on the left-hand end 5 of the leaf spring 1 according to FIG. 7 are able to be accommodated in a form-fitting manner. The lower leg 19 has two elevations 27 and 28, which enter into a form-fitting connection with the indentations 30 and 31 of the undulations 9 and 10. The receptacle 13 is, as already indicated, defined by the shape of the legs 18 and 19 of the retaining element 7 and corresponds substantially to the shape of the left-hand end 5 of the leaf spring 1 according to FIG. 7.

LIST OF REFERENCE SIGNS

1 Leaf spring
2 Bearing eye holder
3 Bearing eye holder
4 End
5 End
6 Retaining element
7 Retaining element
8 Undulation
9 Undulation
10 Undulation
11 Undulation
12 Receptacle
13 Receptacle
14 Orifice
15 Orifice
16 Orifice
17 Orifice
18 Leg
19 Leg
20 Indentation
21 Elevation
22 Indentation
23 Elevation
24 Indentation
25 Indentation
26 Indentation
27 Elevation
28 Elevation 29 Elevation
30 Indentation
31 Indentation
32 Indentation
33 Elevation
34 Elevation
35 Elevation
40 Top side
41 Underside
ME Central longitudinal plane
L Length
H Height
T Depth

What is claimed is:

1. A leaf spring arrangement comprising: a leaf spring made of a fibre-composite material and at least one bearing eye holder, wherein at least one end of the leaf spring is accommodated in a retaining element of the at least one bearing eye holder in a form-fitting manner in a longitudinal direction of the leaf spring, wherein the leaf spring has a length and a central longitudinal plane, wherein the leaf spring has, along its length, perpendicularly to the central longitudinal plane, a cross section in which both a depth and a height are constant along the entire length of the at least one end of the leaf spring, wherein the at least one end of the leaf spring is formed in an undulating manner, wherein the retaining element of the at least one bearing eye holder has a receptacle with a matching undulating shape, wherein the at least one end of the leaf spring has at least one undulation that includes an indentation that extends below the plane of a top side or an underside of the leaf spring, and wherein the receptacle of the at least one bearing eye holder is configured to accommodate the at least one undulation of the leaf spring.

2. The leaf spring arrangement according to claim 1, wherein the at least one end of the leaf spring has at least three undulations.

3. The leaf spring arrangement according to claim 2, wherein the receptacle of the at least one bearing eye holder is configured to accommodate the at least three undulations of the leaf spring in a form-fitting manner.

4. The leaf spring arrangement according to claim 1, wherein the leaf spring, with the at least one end of the leaf spring in the receptacle of the at least one bearing eye holder, is connected to the latter in a materially bonded manner by means of an adhesive.

5. The leaf spring arrangement according to claim 1, wherein the at least one bearing eye holder has orifices.

6. The leaf spring arrangement according to claim 5, wherein the leaf spring has through-orifices corresponding to the orifices in the at least one bearing eye holder.

7. The leaf spring arrangement according to claim 1, wherein the at least one end of the leaf spring has at least two undulations, and wherein the receptacle of the at least one bearing eye holder is configured to accommodate the at least two undulations of the leaf spring in a form-fitting manner.

* * * * *